Aug. 22, 1950 W. G. THOMAS 2,519,415

CHANGEABLE SELECTIVE CIRCUIT

Filed Aug. 14, 1943 4 Sheets-Sheet 1

INVENTOR.
WILLIAM G. THOMAS

BY William D. Hall,
Attorney

Aug. 22, 1950 W. G. THOMAS 2,519,415

CHANGEABLE SELECTIVE CIRCUIT

Filed Aug. 14, 1943 4 Sheets-Sheet 2

INVENTOR.
WILLIAM G. THOMAS
BY William D. Hall.
Attorney

Aug. 22, 1950 W. G. THOMAS 2,519,415

CHANGEABLE SELECTIVE CIRCUIT

Filed Aug. 14, 1943 4 Sheets-Sheet 3

INVENTOR.
WILLIAM G. THOMAS
BY
William D. Hall
Attorney

INVENTOR.
WILLIAM G. THOMAS.
BY William D. Hall
Attorney.

Patented Aug. 22, 1950

2,519,415

UNITED STATES PATENT OFFICE 2,519,415

CHANGEABLE SELECTIVE CIRCUIT

William G. Thomas, Avon, N. J.

Application August 14, 1943, Serial No. 498,645

5 Claims. (Cl. 250—14)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to selective circuits, and more particularly to a selective circuit the resonant frequency of which is accurately fixed by factory adjustment, yet readily changeable in the field.

The object of the present invention is to provide a selective circuit which is fixedly and accurately tuned to a single desired frequency, yet which may be readily changed to be fixedly and accurately tuned to another desired frequency. The apparatus is of particular value for use under field conditions which would not permit careful tuning. A further object is to make the tuning independent of variations in vacuum tubes and other circuit components. Another object of the invention is to make the available change in tuning cover a very wide frequency range. Still another object is to provide for independent change of several different frequencies, for example, a radio frequency and an audio frequency.

In accordance with the present invention, a main part of the apparatus, for example a complete radio frequency amplifier stage, or a complete superregenerative detector stage, or a complete audio frequency amplifier stage, is assembled in a small compact can built around a connector in such a fashion that the complete stage may be interengaged with a mating connector, or may be bodily removed and replaced with another stage which is generally similar but tuned to a different desired frequency. The various stages may be carefully adjusted and tuned at the factory, and any desired change in frequency is readily made without any adjustment or tuning in the field.

To accomplish the foregoing objects, and other more specific objects which will hereinafter appear, my invention resides in the radio circuit elements and their relation one to the other, as hereinafter are more particularly described in the specification and sought to be defined in the claims. The specification is accompanied by drawings in which Figure 1 is a perspective view showing part of the apparatus embodying features of my invention;

Figures 1, 2:
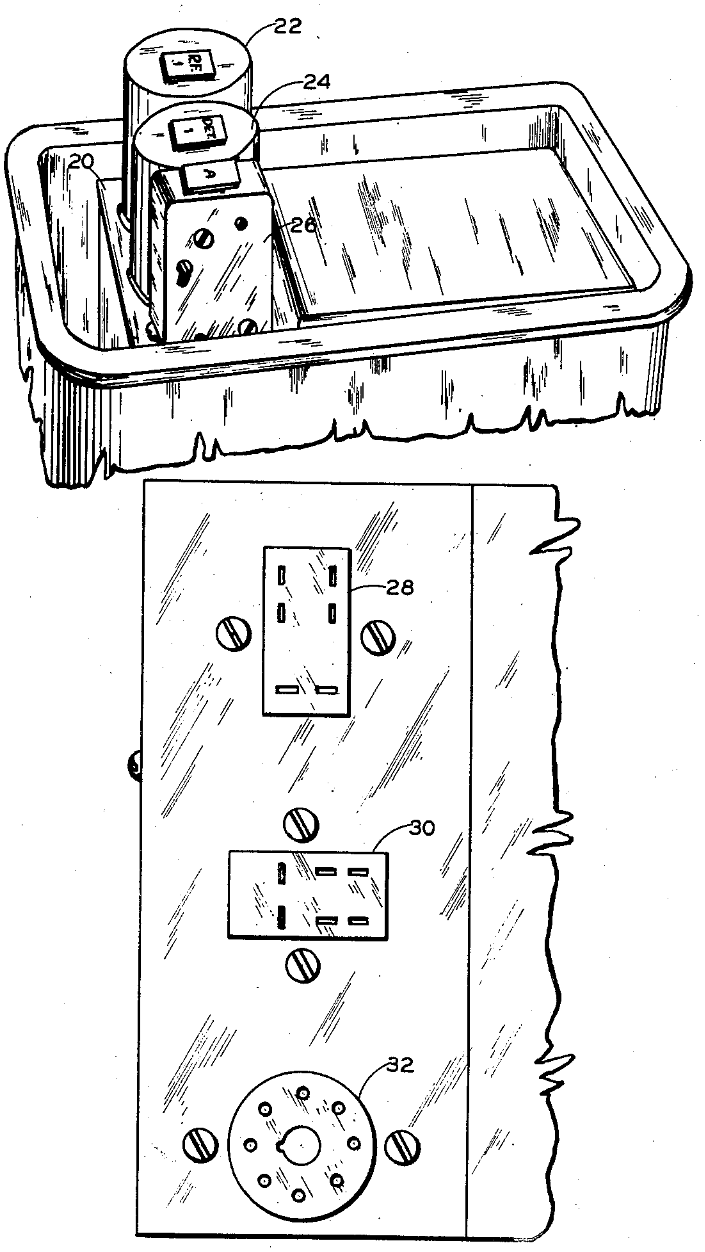
Figure 2 is a plan view of a part of the chassis into which the component stages are plugged.

Referring to the drawing, and more particularly to Figure 1, the radio receiver here involved includes a chassis 20 into which are detachably plugged a plurality of complete stages. In the present case there are specifically a radio frequency amplifier and buffer stage 22, a superregenerative detector stage 24, and a tuned or peaked audio frequency amplifier stage 26. Figure 2 shows the chassis in plan with the stages removed, and it will be seen that the connectors 28, 30, and 32 are in this instance female sockets, the socket 28 being adapted to detachably receive the radio frequency amplifier with a plug-in fit; the socket 30 being adapted to detachably receive the superregenerative detector stage; and the socket 32 being adapted to detachably receive the audio frequency stage. The connectors are preferably so arranged as to be non-interchangeable.

Figure 3:
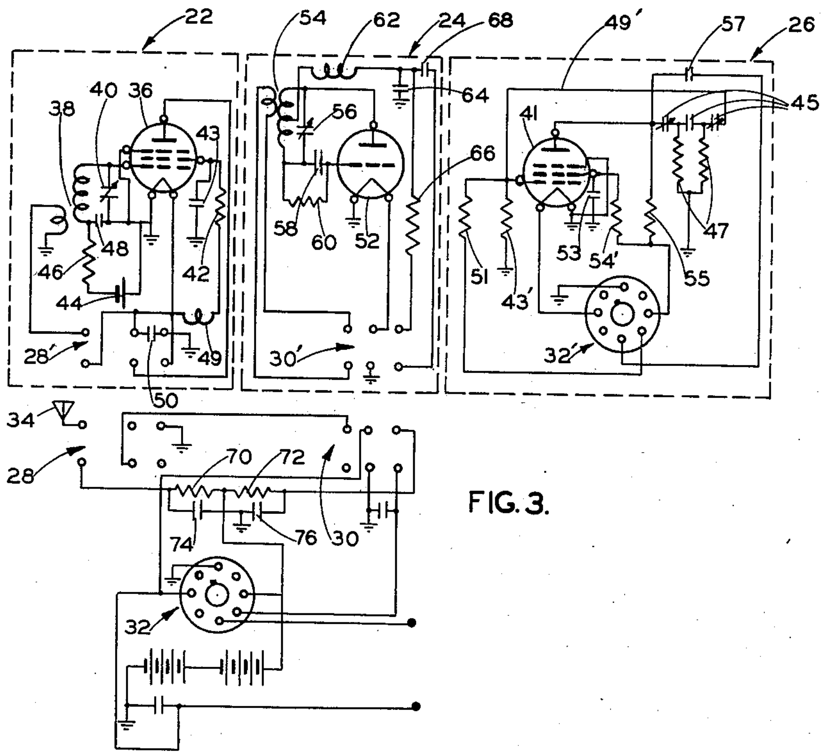
Figure 3 is a schematic wiring diagram of the circuit used in the particular form of the invention here disclosed.

The particular radio circuit here employed is diagrammatically illustrated in Figure 3, in which the changeable radio frequency amplifier and buffer stage is enclosed within the broken-line rectangle 22; the changeable superregenerative detector stage is enclosed within the broken-line rectangle 24; and the audio frequency amplifier stage is enclosed within the broken-line rectangle 26. The sockets forming a part of the chassis are indicated at 28, 30, and 32, while the mating plugs are marked 28', 30', and 32'.

Referring to the radio frequency amplifier stage 22, it will be seen that the antenna 34 is coupled through connector 28, 28' to amplifier tube 36 by means of a radio frequency input transformer or coil 38. The grid circuit of tube 36 is tuned by means of a variable padder condenser 40. The tube 36 is a pentode, and includes a screen potential dropping resistor 42. Condenser 43 is a screen bypass condenser to keep the screen at R. F. ground potential. Grid bias is provided by means of a grid bias cell 44. Resistor 46 helps decouple the grid circuit from the plate circuit, and reduces the grid loading. It also improves the amplification obtained. Condenser 48 is a blocking condenser to keep the D. C. grid bias off the cathode. Choke 49 keeps R. F. energy from the battery, and is aided by bypass condenser 50.

Referring now to the superregenerative detector stage 24, this is essentially an ultra audion circuit. The tube 52 has an input transformer 54, which is tuned by means of a variable padder condenser 56. The detector is biased by means of a grid condenser 58 and grid resistor 60. The radio frequency choke 62 is to block R. F., and plate bypass condenser 64 is associated with a plate resistor 66 for the same purpose. An A. F. coupling condenser is provided at 68 to keep the plate voltage off the grid of the following audio stage.

The audio amplifier stage 26 comprises a pentode 41, having an input resistor 43'. A series resistor 51 is used in the input lead from the detector stage to help isolate the high impedance plate circuit of the A. F. amplifier from the relatively lower impedance output circuit of the detector stage. The plate circuit is an R. C. network made up of series condensers 45 and shunt resistors 47. Feedback from anode to grid is provided by a conductor 49', the amount of feedback being somewhat less than that needed for self oscillation. The R. C. network changes the phase of the output approximately 180°, thereby making the stage regenerative, and hence peaked in its amplification characteristic for one particular audio frequency, this frequency being dependent largely on the values of the R. C. network. In this way the audio stage is made the equivalent of a tuned stage, yet is very compact, inexpensive, and light in weight, it being completely devoid of the very large inductors and capacitors which would be needed to tune an audio frequency by means of L. C. elements in the usual way. It also has greater gain than is obtainable using an ordinary tuned amplifier. This peaked audio frequency circuit is not a part of the present invention, it being disclosed and claimed in a copending application of Howard T. Head, Serial Number 599,299 filed June 13, 1945. However, the feature whereby the complete peaked A. F. amplifier stage is contained within a compact shielded housing detachably plugged in position so that the A. F. frequency to which it is tuned may be readily changed at will by simply substituting one complete unit for the other, is a feature of the present invention.

Condenser 53 is a screen bypass condenser. Resistor 54' is a screen potential dropping resistor. Resistor 55 is a plate load resistor for the tube 41. Condenser 57 is a coupling condenser leading to further apparatus.

The wiring below the dotted rectangles 22, 24, and 26 is that found in the chassis associated with the sockets which receive the plugs indicated at 28', 30', and 32' respectively. Resistors 70 and 72 and condensers 74 and 76 form a decoupling network to keep R. F. from the common battery and thereby reduce feedback from the superregenerative detector to the R. F. amplifier stage. The resistor 72 also functions to drop the plate voltages for the detector tube, a lower voltage being there provided to keep the oscillations weak in order to minimize reradiation.

Figure 8:
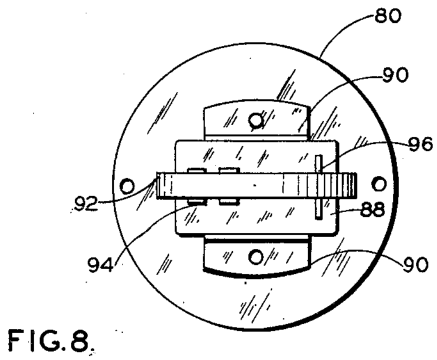
Figure 8 is a plan view showing how the tube socket is assembled with the plug.
Figure 11:
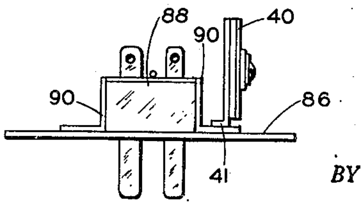
Figure 11 is an elevation of a sub-assembly showing how the tuning or padder condenser is assembled with the plug.

The mechanical arrangement of the radio frequency amplifier stage is illustrated in Figures 4 through 7 of the drawing. The shielding can is made up of a circular sheet metal base 80 and an inverted cup-shaped can 82, these being secured together in any suitable manner, as by means of screws 84. The base 80 has a rectangular hole 86 (Figure 7) through which project the tongues of the male plug. The manner in which the plug is secured to disk 80 is best shown in Figures 8 and 11, in which it will be seen that the body 88 of the connector is provided with metal angles 90, the bottom parts of which are welded to base 80. In this way the connector and the base 80 form a unit.

Figure 9:
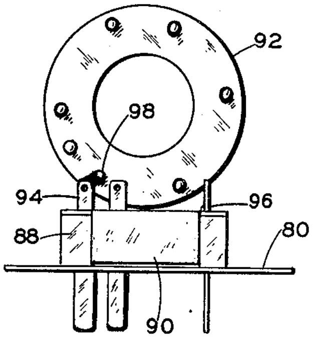
Figure 9 is a front elevation of the same.
Figure 15:
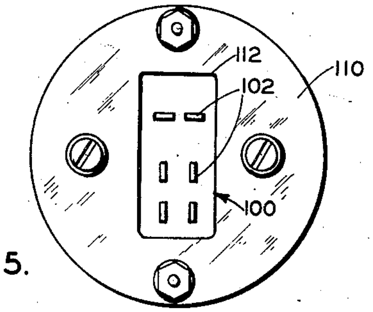
Figure 15 is a bottom view of the unit.

The vacuum tube 36 (Figures 4, 5, and 6) is received in an annular insulation tube socket 92, the latter being disposed vertically with the tube disposed horizontally. The particular tube here employed is a pentode RCA type 959. The manner in which the tube socket 92 is secured to the connector is best shown in Figures 8 and 9. Referring to Figure 8 the thickness of tube socket 92 is so selected as to be received tightly between the two rows of soldering lugs at the top of the connector. The lugs 94 are turned differently from the lugs 96 so that the plug cannot be reversed end for end. One of the soldering lugs 94 is soldered to one of the pins 98 (see Figure 9) of tube socket 92, thus providing a necessary electrical connection, and also mechanically securing the tube socket firmly in position.

Figure 5:
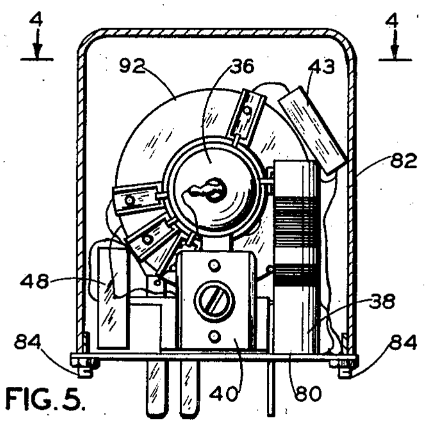
Figure 5 is a section taken in elevation approximately in the plane of the line 5—5 of Figure 4.
Figure 6:
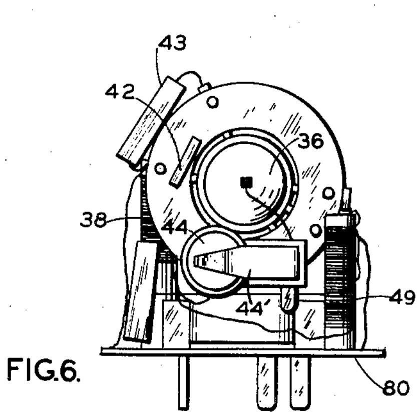
Figure 6 is an elevation with the shielding can removed, said elevation looking in the direction of the arrows 6—6 of Figure 4.
Figure 7:
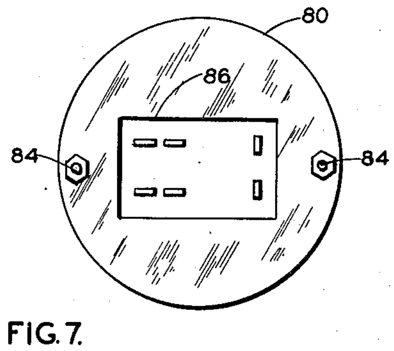
Figure 7 is a bottom view of the plug-in unit.

The input inductor of the radio frequency stage is shown at 38; this being secured in position by gluing the lower end of its core to the bottom plate 80. The main tuning or padder condenser is indicated at 40. The manner in which this is secured in position is best shown in Figure 11, in which it will be seen that the condenser includes a bracket 41 which is soldered to one of the angles 90 of the connector. The screen potential dropping resistor is shown at 42 (Figure 6). The screen bypass condenser is visible at 43. The blocking condenser is shown at 48 (Figures 4 and 5).

Figure 4:
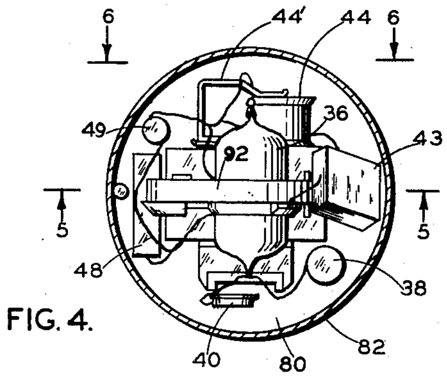
Figure 4 is a horizontal section through a radio frequency stage taken approximately in the plane of the line 4—4 of Figure 5.
Figure 10:
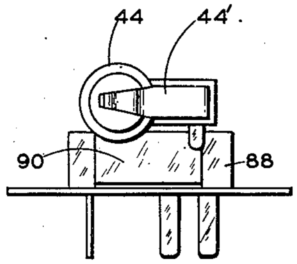
Figure 10 is an elevation showing how the grid bias cell is assembled with the plug.
Figure 12:
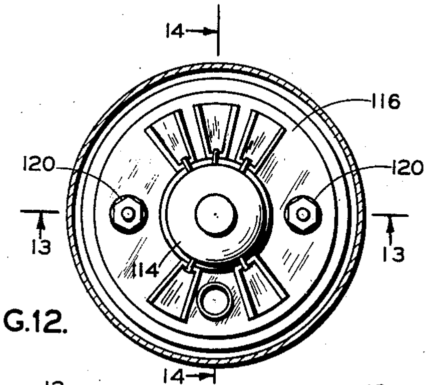
Figure 12 is a horizontal section through a superregenerative detector stage taken approximately in the plane of the line 12—12 of Figure 13.

The grid bias cell is indicated at 44 (Figures 4, 6, and 10). This is a small, button-like cell sold under the commercial name "P. R. Mallory & Company, Inc." It is secured in a spring holder 44', which is soldered to one of the angles 90. The choke 49 (Figures 4 and 6) is cemented to the base plate 80.

Figure 13:
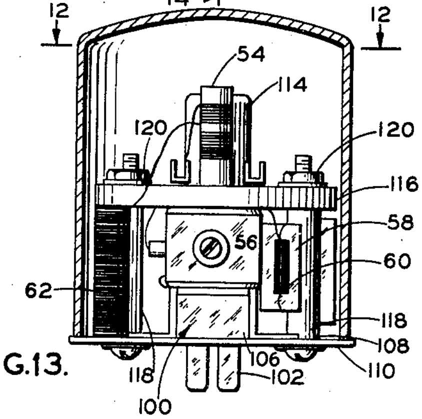
Figure 13 is a section taken in elevation approximately in the plane of the line 13—13 of Figure 12.
Figure 14:
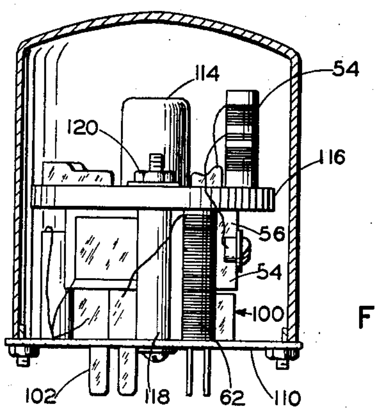
Figure 14 is a section taken in elevation approximately in the plane of the line 14—14 of Figure 12.
Figure 16:
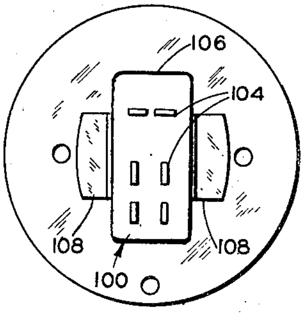
Figure 16 is a plan view of the base of the unit.

The mechanical arrangement of the superregenerative detector stage is shown in Figures 12 through 16 of the drawing. Referring thereto the connector is a male plug 100, similar to that previously described in having prongs 102 projecting downwardly therefrom and soldering lugs 104 projecting upwardly therefrom. The insulation body 106 (Figures 13 and 16) further carries a pair of metal angles 108. A sheet metal bottom plate 110 has a rectangular opening 112 (Figure 15) large enough to receive the prongs 102, and is permanently secured to the plug by means of the angles 108 (Figures 13 and 16). The vacuum tube 114 is an acorn-type tube. The particular tube here used is an RCA-957, this being a triode. It is received in a ring-type socket 116. The latter is disposed horizontally so that the tube is vertical. The tube socket 116 is secured to and spaced above the base plate 110 by means of a pair of insulation spacers 118 (Figures 13 and 14). These are preferably tubular and receive screws passing through the base plate and spacers, the assembly being completed by nuts 120. The other circuit elements are fastened in position in any convenient manner, and in the specific arrangement here illustrated, the detector coil or input transformer is shown at 54; the tuning or padder condenser is shown at 56; the grid condenser and resistor are shown at 58 and 60; and the radio frequency choke is shown at 62.

The detailed mechanical arrangement of the peaked amplifier stage is not shown herein, but it will be sufficient to state that it comprises a pronged plug mating with the socket 32 shown in Figure 2, and a shielding can built around and secured to the plug, this can being shown at 26 in Figure 1. The particular plug and socket here used are circular and similar to those used for certain vacuum tubes. The A. F. amplifier tube, the tube socket, and associated R. C. network elements are all housed within the shielding can marked 26 in Figure 1, and are connected electrically to the prongs of the plug in the manner clearly shown in Figure 3 within the rectangle 26.

It will be evident that the circular plug of the A. F. amplifier stage is non-interchangeable with the other rectangular plugs, thus making it impossible to plug it into the wrong socket. Similarly, the plugs of the R. F. amplifier stage and the detector stage are differentiated by a change in the spacing of the prongs in order to prevent misapplication of the units.

The particular connectors shown for the R. F. and detector stages are a type made by Howard B. Jones. The bias cell of the R. F. amplifier stage is made by P. R. Mallory & Company, Inc. The acorn tubes are ordinarily used for high frequency work in a range of, say, 100 to 300 megacycles. The present receiver operates in a range of 20 to 40 megacycles, and the acorn tubes are employed not with a view to reaching a high frequency range, but rather with a view to compactness. The particular tubes here used are RCA #959, 957, and IL4 respectively.

Figure 17:
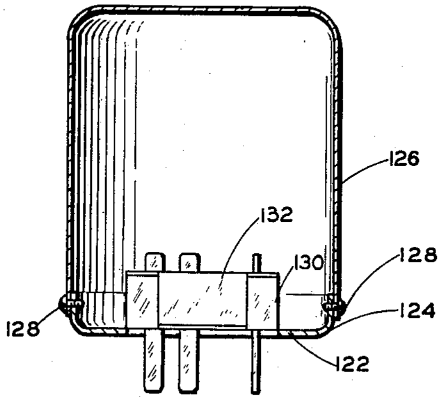

Figure 17 illustrates a modified shield arrangement for the radio frequency stage. In this case the bottom plate 122 differs from that previously described in having an upwardly turned flange 124 around which the lower end of the shield can 126 is snugly received. The parts are assembled by small screws 128 threaded into the flange 124. The plug 130 and its relation to bottom plate 122 is the same as previously described, it being secured in position by means of metal angle pieces 132. The advantage of the modified shield shown in Figure 17 is that the bottom plate 122 is devoid of downwardly projecting screws, such as those shown at 84 in Figure 5. This permits the assembly to be pushed down until the bottom is flush with the chassis.

Figure 18:
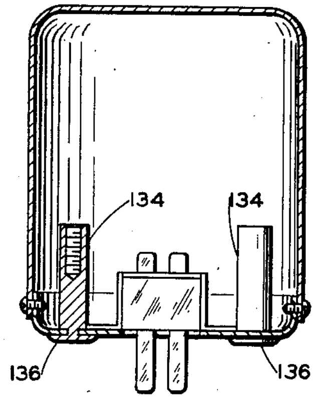
Figures 17 and 18 are vertical sections through modified shielding cans.

Figure 18 shows a similar modification of the shield can for the detector stage. This differs only in having pedestals or supports 134, the lower ends of which are riveted to the bottom plate, as indicated at 136. The upper ends are drilled and tapped to receive screws for mounting the vacuum tube socket in horizontal position, much as shown in Figures 13 and 14, except that in this case short, downwardly pointed screws may be used, instead of through-bolts.

It is believed that the construction and method of use of my improved radio receiver, as well as the many advantages thereof, will be apparent from the foregoing description. Each of the stages is extremely compact, and is so arranged internally that the various circuit elements are connected by short leads. A complete stage may be handled much like an ordinary vacuum tube is handled in a conventional receiver. To change the radio frequency to which the receiver is selective, the A. F. amplifier stage is bodily changed. In either case the change may be made rapidly under difficult field conditions, yet the tuning will be highly accurate, as obtained by careful factory adjustment under ideal conditions with the best of instruments available for alignment purposes. This predetermined fixed tuning takes into account the variations in individual tubes and other circuit components built into the particular receiver stage.

From the standpoint of frequency change alone, the R. F. amplifier and detector stages might be built as a single plug-in unit. However, inasmuch as it is anyway desired to completely shield one of these stages from the other, and inasmuch as the circuit elements for a single stage make up into a cam of small, conveniently-handled size, I prefer to make these stages as individual plug-in units even though both are tuned to a common R. F. frequency. Effective shielding is particularly important for the detector stage, in order to help prevent reradiation. In fact, it is largely with this object in view that the R. F. amplifier stage is provided at all, it acting primarily as a buffer stage to minimize reradiation, although some amplification may also be obtained.

It will be apparent that while I have shown and described my invention in a preferred form, many changes and modifications may be made in the structure disclosed without departing from the spirit of the invention as sought to be defined in the following claims.

I claim:

1. A radio receiver including a plurality of tuned amplifier stages and a plurality of other circuit components some of which are common to all of said stages, said receiver comprising a chassis, a plurality of female sockets fixedly attached to said chassis and permanently connected to said circuit components, a plurality of male plugs detachably mating with said sockets, each plug including an insulation body having tongues projecting downwardly from the bottom and soldering lugs projecting upwardly at the top and metal brackets at the sides, a circular sheet metal base plate permanently secured to said plug by means of said brackets, a cylindrical shield can removably secured to said base plate and forming therewith a completely shielded housing, and a complete radio amplifier stage electrically connected to the lugs of said plug, said stage including an acorn-type vacuum tube with a ring socket, said ring socket being disposed in a vertical plane between the aforesaid lugs of the plug, and additional associated tuning coils and condensers, all of said parts being mechanically secured to the plug and base plate and being housed within said shield can, whereby said stage is adapted to be bodily removably plugged into one of said female sockets.

2. A radio receiver including a plurality of stages and a plurality of other circuit components some of which are common to all of said stages, said receiver comprising a chassis, a plurality of female sockets fixedly attached to said chassis and permanently connected to said circuit components, a plurality of male plugs detachably mating with said sockets, each plug including an insulation body having tongues projecting downwardly from the bottom and soldering lugs projecting upwardly at the top and metal brackets at the sides, a circular sheet metal base plate permanently secured to said plug by means of said brackets, a cylindrical shield can removably secured to said base plate and forming therewith a completely shielded housing, and a complete stage electrically connected to the lugs of said plug, said stage including an acorn-type vacuum tube with a ring socket, said ring socket being disposed in a vertical plane between the aforesaid lugs of the plug, the thickness of said socket being such that said socket is retained tightly between said lugs, at least one of said lugs being fixed to one of the pins of said socket thereby securing said socket firmly in position, and additional associated tuning coils and condensers, all of said parts being mechanically secured to the plug and base plate and being housed within said shield can, whereby said stage is adapted to be bodily removably plugged into one of said female sockets.

3. A radio receiver including a plurality of stages and a plurality of other circuit components some of which are common to all of said stages, said receiver comprising a chassis, a plurality of female sockets fixedly attached to said chassis and permanently connected to said circuit components, a plurality of male plugs detachably mating with said sockets, each plug including an insulation body having tongues projecting downwardly from the bottom and soldering lugs projecting upwardly at the top and metal brackets at the sides, a circular sheet metal base plate permanently secured to said plug by means of said brackets, a cylindrical shield can removably secured to said base plate and forming therewith a completely shielded housing, and a complete stage electrically connected to the lugs of said plug, said stage including an acorn-type vacuum tube with an annular insulation tube socket, insulation spacing means fixed to said base plate and extending upwardly thereof, said socket being secured in a horizontal plane to said spacing means, and additional associated tuning coils and condensers, all of said parts being mechanically secured to the plug and base plate and being housed within said shield can, whereby said stage is adapted to be bodily removably plugged into one of said female sockets.

4. An electronic apparatus including a plurality of stages and a plurality of other circuit components some of which are common to all of said stages, said apparatus comprising a chassis, a plurality of female sockets fixedly attached to said chassis and permanently connected to said circuit components, a plurality of male plugs detachably mating with said sockets, each plug including an insulation body having tongues projecting downwardly from the bottom and soldering lugs projecting upwardly at the top and metal brackets at the sides, a circular sheet metal base plate permanently secured to said plug by means of said brackets, a cylindrical shield can removably secured to said base plate and forming therewith a completely shielded housing, and a complete stage electrically connected to the lugs of said plug, said stage including an electron tube mounted within said shielded housing, and additional tuning coils and condensers, all of said parts being mechanically secured to the plug and base plate and being housed within said shield can, whereby said stage is adapted to be bodily removably plugged into one of said female sockets.

5. An electronic apparatus including a plurality of stages and a plurality of other circuit components some of which are common to all of said stages, said apparatus comprising a chassis, a plurality of female sockets fixedly attached to said chassis and permanently connected to said circuit components, a plurality of male plugs detachably mating with said sockets, a base plate mechanically secured to said plug, a shield can removably secured to said base plate and forming therewith a completely shielded housing, and a complete stage electrically connected to said plug, said stage including an electron tube mounted within said shielded housing, and additional stage circuit elements, all of said elements being mechanically secured to the plug and base plate and being housed within said shield can, whereby said stage is adapted to be bodily removably plugged into one of said female sockets.

WILLIAM G. THOMAS.

REFERENCES CITED

The following references are of record in the file of this patent:

UNITED STATES PATENTS

| Number | Name | Date |
|---|---|---|
| 1,656,009 | McMullin | Jan. 10, 1928 |
| 1,709,089 | Nash et al. | Apr. 16, 1929 |
| 1,938,656 | Drake | Dec. 12, 1933 |
| 2,028,717 | Hayden | Jan. 21, 1936 |
| 2,111,381 | Barton | Mar. 15, 1938 |
| 2,268,619 | Reid | Jan. 6, 1942 |

FOREIGN PATENTS

| Number | Country | Date |
|---|---|---|
| 289,195 | Great Britain | Apr. 26, 1928 |
| 334,978 | Great Britain | Sept. 18, 1930 |

OTHER REFERENCES

Radio Craft, January 1939, Print in 250-14.